UNITED STATES PATENT OFFICE.

ALBERT G. STEPHENS, OF LOS ANGELES, CALIFORNIA.

PROCESS OF EXTRACTING GOLD OR OTHER METALS FROM REFRACTORY ORES.

SPECIFICATION forming part of Letters Patent No. 641,652, dated January 16, 1900.

Application filed May 8, 1899. Serial No. 716,063. (No specimens.)

*To all whom it may concern:*

Be it known that I, ALBERT G. STEPHENS, a citizen of the United States of America, residing at the city of Los Angeles, in the county of Los Angeles, in the State of California, have invented a certain new and useful Process of and Method for the Extraction of Gold, Silver, Copper, or other Metals and Minerals from Refractory Ores; and I do declare the following to be a full, clear, and exact description of the invention, such as will enable others skilled in the art to which it appertains to compound and use the same.

My invention relates to the extraction of gold, silver, copper, and other metals and minerals from refractory ores, and is specially designed for such purpose.

The object of the invention is to reduce to bullion, metals and minerals from their original ores.

With this object in view the invention consists of the following combination of chemicals:

Formula No. 1 for gold: mix one hundred gallons of water, three hundred ounces of chlorid of lime; salt, one hundred ounces; nitric acid, three hundred ounces; muriatic acid, one hundred ounces, and potassium bromide ten ounces. The formula, as above stated, is for use in the extraction of gold from refractory ores, especially when found in a very refractory state in combination with arsenic, sulfur, and other metals, and also for ores carrying large quantities of telluric acid.

Formula No. 2: mix chlorid of lime, two hundred and fifty ounces; nitric acid, three hundred ounces; water, one hundred gallons; salt, two hundred and fifty ounces, and bromide of potassium, ten ounces. This formula is for the extraction of gold, copper, iron, and other metals from oxidized and unoxidized ores when not found in combination with an excess of arsenic, sulfur, antimony, and telluric acid. This is specially adapted to those forms of copper carrying large amounts of silica and other foreign matter, and I claim by this formula to be able to treat copper ores combined with gold or silver, or by itself, which cannot be treated by smelter or other processes.

Formula No. 3: mix chlorid of lime, one hundred ounces; nitric acid, one hundred and fifty ounces; muriatic acid, one hundred and fifty ounces; salt, ten ounces; potassium bromide, ten ounces, and water, one hundred gallons. This formula being a very weak modification is intended to extract silver, gold, or copper from ores where it is not in combination with refractory metals.

These compositions can be used in leaching-vats, revolving barrels, or any of the known appliances for extracting the aforesaid metals by chemical process, either by filtration or agitation.

There are many different ores in which the combination can be applied to ores, also many variations may be used in order to make the application perfect and extract all of the metals.

Having thus described my invention, what I claim, and desire to secure by Letters Patent, is—

A composition for the extraction of gold and other metals, composed of water, chlorid of lime, muriatic acid, nitric acid, bromid of potassium, and chlorid of sodium, to be varied according to the refractory conditions of the ores treated.

In testimony whereof I have hereunto affixed my signature, in the presence of two witnesses, in the city, county, and State hereinabove first named, this 19th day of April, A. D. 1899.

ALBERT G. STEPHENS.

Witnesses:
BYRON L. OLIVER,
BURTON HAMLIN.